United States Patent
Richardson et al.

(10) Patent No.: US 10,513,234 B2
(45) Date of Patent: Dec. 24, 2019

(54) VEHICLE ELECTRICAL SYSTEM TO FACILITATE INTEGRATION OF THIRD-PARTY BATTERIES

(71) Applicant: FORD GLOBAL TECHNOLOGIES, LLC, Dearborn, MI (US)

(72) Inventors: Robert Anthony Richardson, Chelmsford (GB); Yucel Aybar, Romford (GB); Martin Day, Wickford Essex (GB)

(73) Assignee: Ford Global Technologies, LLC, Dearborn, MI (US)

( * ) Notice: Subject to any disclaimer, the term of this patent is extended or adjusted under 35 U.S.C. 154(b) by 300 days.

(21) Appl. No.: 15/670,296

(22) Filed: Aug. 7, 2017

(65) Prior Publication Data
US 2018/0037178 A1    Feb. 8, 2018

(30) Foreign Application Priority Data
Aug. 8, 2016 (GB) .................... 1613579.0

(51) Int. Cl.
*B60L 1/00* (2006.01)
*B60R 16/033* (2006.01)
*H02J 7/14* (2006.01)

(52) U.S. Cl.
CPC .......... *B60R 16/033* (2013.01); *H02J 7/1423* (2013.01)

(58) Field of Classification Search
CPC ........................................................ B60L 1/00
USPC ........................................................ 307/9.1
See application file for complete search history.

(56) References Cited

U.S. PATENT DOCUMENTS

| | | | |
|---|---|---|---|
| 2006/0110655 A1 | 5/2006 | Wirdel | |
| 2009/0230766 A1 | 9/2009 | Miyama | |
| 2009/0243387 A1* | 10/2009 | Conen | H02J 1/10 307/10.1 |
| 2011/0025124 A1 | 2/2011 | Brabec | |
| 2013/0082517 A1* | 4/2013 | Kawai | B60R 16/033 307/9.1 |
| 2013/0106320 A1 | 5/2013 | Yugo | |
| 2013/0154356 A1 | 6/2013 | Nakajima | |
| 2014/0261250 A1 | 9/2014 | Katayama et al. | |
| 2015/0329001 A1 | 11/2015 | Eifert et al. | |

FOREIGN PATENT DOCUMENTS

WO    2014/025069 A1    2/2014

* cited by examiner

*Primary Examiner* — Rexford N Barnie
*Assistant Examiner* — Dru Parries
(74) *Attorney, Agent, or Firm* — Frank Lollo; Brooks Kushman P.C.

(57) ABSTRACT

An electrical system for a motor vehicle is provided. The electrical system includes one or more vehicle batteries configured to provide electric power to one or more vehicle systems. The electrical system also includes a terminal configured to allow a third-party loads and/or a third-party batteries to be electrically coupled to the electrical system at the terminal. The electrical system further includes a relay configured to selectively couple the terminal to the vehicle batteries. A controller is configured to control the operation of the relay. A method of controlling operation of an electrical system for a motor vehicle is also provided.

19 Claims, 9 Drawing Sheets

VEHICLE ELECTRICAL SYSTEM TO FACILITATE INTEGRATION OF THIRD-PARTY BATTERIES

CROSS-REFERENCE TO RELATED APPLICATIONS

This application claims foreign priority benefits under 35 U.S.C. § 119(a)-(d) to GB Application 1613579.0 filed Aug. 8, 2016, which is hereby incorporated by reference in its entirety.

TECHNICAL FIELD

The present disclosure relates to an electrical system for a vehicle configured to facilitate the integration of third-party loads and/or batteries.

BACKGROUND

Many light commercial vehicles undergo some form of electrical conversion after manufacture to include additional third-party electrical equipment desired for their particular purpose or application. Such conversions vary in size and complexity from the simple incorporation of additional lighting, to the full conversion of the light commercial vehicle into an emergency services vehicle, which may be equipped with sirens, emergency lighting, specialist equipment and additional batteries to power the equipment over an extended period.

For some vehicles, electrical conversion is commonplace, for example approximately 70% of all Ford® Transits are electrically converted to some extent. When electrical conversion of a particular vehicle is commonplace, it may be desirable for the vehicle manufacturer to provide appropriate technical information to official vehicle converters, to enable the third-party batteries and electrical systems to be integrated with the existing electrical system of the vehicle in an appropriate way. Additionally, in some cases, vehicle manufacturers may offer certain conversions themselves, which are performed by the vehicle manufacturers, or specific external suppliers, following manufacture of the vehicle, e.g. after the vehicle has left the main production line.

Even when a conversion is performed by professional converters, heavy use of the third-party electrical systems can have detrimental effects on the original electrical system of the vehicle. Also, such third-party systems may have high current sleep modes or may not be efficiently isolated when not required. These can impact the normal operation of the vehicle, e.g. preventing the engine of the vehicle from being started or reducing the longevity of the vehicle battery.

SUMMARY

According to an aspect of the present disclosure, there is provided an electrical system for a motor vehicle, the electrical system comprising: one or more vehicle batteries configured to provide electric power to one or more vehicle systems; a terminal configured to allow third-party loads and/or third-party batteries to be electrically coupled to the vehicle electrical system at the terminal; a relay configured to selectively couple the terminal to the vehicle batteries; and a controller configured to control the operation of the relay, wherein the controller is configured to determine a current drawn by the third-party batteries and/or loads; and wherein the controller is configured to control the operation of the relay at least partially according to the determined current.

Third-party loads and batteries may be loads and batteries that are not common to the vehicle product range, e.g. they may not be fitted on the original manufacturing line of the vehicle. They may not be fitted by the original equipment manufacturer of the vehicle to which they are being fitted. Third-party loads and batteries may be fitted post-manufacture of the vehicle as a conversion and/or customization of the vehicle. The third-party loads and batteries may be permanently installed in, e.g. fixed to, the vehicle.

The terminal may be a power take-off terminal. The third part loads and/or batteries may be provided within a third-party electrical system.

The controller may be configured to determine a voltage of the third-party batteries and/or loads. The controller may be configured to control the operation of the relay at least partially according to the determined voltage.

The controller may be configured to determine a battery configuration of the vehicle batteries and/or third-party batteries. The battery configuration may include a type of battery provided on the vehicle and/or a type of third-party battery coupled at the terminal. For example, the batteries may be flooded, Absorbed Glass Mat (AGM) or gel type lead acid batteries, or a combination of the above. Additionally or alternatively, the battery configuration may include a number of vehicle batteries provided in the electrical system and/or a number of third-party batteries electrically coupled to the electrical system at the terminal. The controller may be configured to control the operation of the relay at least partially according to the determined battery configuration.

The controller may be configured to detect an engine ignition activation, e.g. detect that the electrical system has been configured to provide electrical power to an ignition system of an engine of the vehicle.

The controller may be configured to determine a voltage of the third-party batteries and/or loads. The controller may be further configured to provide an output signal if an engine ignition activation is detected when the determined voltage is above a first, e.g. upper, threshold value. The first threshold value may be a value of voltage at which it may be determined that an external charger is being used to charge a battery of the third-party electrical system (or vehicle). The electrical system may comprise a warning device that, upon receipt of the output signal, triggers a warning to the driver that the third-party batteries are charging. The output signal may, therefore, be configured to trigger a warning to the driver that the third-party batteries are charging. The likelihood of the driver driving away with charging cables attached to the vehicle may thus be reduced.

The controller may be configured to control the operation of the relay to isolate the terminal from the vehicle batteries when the engine ignition activation is detected. Additionally or alternatively, the controller may be configured to control the operation of the relay to isolate the terminal from the vehicle batteries when an engine start attempt is detected. In either case, isolating the terminal from the vehicle batteries may protect the third-party batteries from being exposed to high starter motor currents.

The controller may be configured to detect a first engine start attempt. The controller may be further configured to detect a second engine start attempt. The controller may be configured to control the relay to couple the terminal to the vehicle batteries if the second engine start attempt is detected within a first predetermined period from the first engine start event. This may allow third-party batteries to be coupled to the vehicle electrical system to assist the vehicle batteries in powering the starter motor when a first start attempt has failed. This may allow the engine of the vehicle to be started when the state of charge of the vehicle batteries is too low to start the engine otherwise.

The controller may be configured to determine a voltage of the third-party batteries and/or loads. The controller may be further configured to control the relay to couple the terminal to the batteries if the determined voltage is at or above a second, e.g. lower, threshold value. (The second threshold value may be a value of voltage which indicates a low or minimum state of charge.) This may ensure that the third-party batteries are not coupled to the vehicle electrical system, e.g. to assist with cranking, if the voltage of the third-party batteries is too low and may have a detrimental effect on starting the engine.

The controller may be configured to detect an engine start, e.g. determine when the engine has been started. The controller may be further configured to control the relay to couple the terminal to the batteries following a second period of time, e.g. after the engine start has been detected. This may allow the third-party loads to be powered by the vehicle electrical system, e.g. by the vehicle batteries and/or an alternator provided on the vehicle, after the engine has been started.

The controller may be configured to determine a voltage of the third-party batteries and/or loads. The length of the second period may be at least partially determined according to the determined voltage. The controller may be configured to activate the alternator before coupling the vehicle electrical system to the third-party loads and/or batteries. For example, if the voltage of the third-party batteries is low, it may not be desirable to couple the third-party system to the vehicle electrical system until the alternator of the vehicle is operating to provide power to the vehicle electrical system. Controlling the operation of the vehicle charge system, e.g. alternator, prior to high third-party load connectivity may compensate against voltage drop issues from third-party systems inrush current impacting other vehicle systems.

The controller may be configured to control the operation of an alternator of the vehicle to provide power to the vehicle electrical system following a successful engine start. The controller may be further configured to control the operation of the alternator, e.g. activate the alternator, of the vehicle to provide power to the third-party loads and/or third-party batteries following a successful engine start. The controller may be configured to determine a voltage of the third-party batteries and/or loads. The controller may be configured to control the operation of the alternator to provide power to the vehicle electrical system if the determined voltage of the third-party batteries and/or third-party loads is below a second threshold value. The determined voltage may be considered as, unless the state of charge of the third-party batteries is low or a large current is being drawn by the third-party loads, it may not be desirable for the controller to activate the alternator.

The controller may be configured to determine a battery configuration of the vehicle batteries and/or third-party batteries. The second threshold value may be at least partially determined according to the battery configuration. For example, the second threshold value may be set according to the type and/or number of third-party batteries coupled to the terminal, e.g. provided in the third-party electrical system.

The controller may be configured to determine a voltage of the third-party batteries and/or loads. The controller may be configured to control the relay to couple the terminal to the vehicle batteries if the determined voltage is above a first threshold value. (The first threshold value may be a value of voltage at which it may be determined that an external charger is being used to charge a battery of the third-party electrical system or vehicle.) This may allow the vehicle batteries to be charged by a charger, which has been connected to the third-party batteries. It may be desirable to charge the vehicle batteries in this way when it is determined that the engine is not running. Additionally or alternatively, the controller may be configured to control the relay to isolate the terminal from the vehicle batteries after the engine has started, if the determined voltage is above a first (upper) threshold value. (The first threshold value may be a value of voltage at which it may be determined that an external charger is being used to charge a battery of the third-party electrical system or vehicle.) It may not be desirable to couple the terminal to the vehicle batteries if a charger is being used to charge the third-party batteries whilst the engine is running.

The controller may be configured to detect an engine off event, e.g. determine when the engine has stopped running. The controller may be configured to determine whether the engine has stopped due to an engine start/stop system or due to the engine ignition being deactivated.

The controller may be further configured to control the relay to isolate the terminal from the vehicle batteries after a third period of time after the engine off event. This may prevent the vehicle batteries being drained by the third-party loads.

The controller may be further configured to control the relay to isolate the terminal from the vehicle batteries immediately after the engine off event, if the engine off event was due to an engine start/stop system. This may allow a subsequent engine start by the engine start/stop system to be successful.

The controller may be configured to determine a battery configuration of the vehicle batteries and/or third-party batteries. The third period of time may be determined at least partially according to the battery configuration.

The controller may be configured to control the relay to isolate the terminal from the vehicle batteries when a voltage of the vehicle batteries drops below a second threshold value, e.g. to prevent the state of charge of the vehicle batteries being reduced to an undesirable level.

The controller may be configured to control the relay to isolate the terminal from the vehicle batteries when a voltage of the vehicle batteries remains below a second threshold value for a fifth period of time, after the engine off event. Delaying the isolation of the terminal from the batteries may allow for high inrush currents of the third-party loads, which may reduce the voltage of the battery for a short period, to be tolerated.

The controller may be configured to provide a low voltage warning signal when a voltage of the vehicle batteries remains below a second threshold value for a fourth period of time, after the engine off event, e.g. the controller may warn a user of the vehicle that the relay may be opened, or that third-party loads are drawing a large current, which has reduced the voltage of the electrical system. The fourth period of time may be less than the fifth period of time. The electrical system may comprise a warning device which may upon receipt of the low voltage warning signal trigger a warning to the operator, e.g. to allow time for urgent actions to avoid inconvenience of no power prior to isolation of the terminal from the vehicle batteries.

The controller may predict the future voltage of the vehicle batteries, e.g. based on the current state of charge and loads. If it is determined that the voltage may fall below the second threshold value after a fixed period of time (e.g. in 30 seconds time), the controller may emit a warning signal to the user. The warning signal may indicate to the user that the relay is about to be opened. The relay may be opened when the voltage falls below the second threshold. If the fall in the vehicle battery voltage takes longer than predicted, the opening of the relay may be delayed until the voltage actually falls below the second threshold. By contrast, if the fall in the vehicle battery voltage is faster than predicted, the opening of the relay may be delayed until the fixed period of time has elapsed, e.g. so that power to the third-party system is not lost before the user expects it to.

The controller may be configured to determine a battery configuration of the vehicle batteries and/or third-party batteries. The second threshold value may be determined at least partially according to the battery configuration.

The controller may be configured to correlate the state of charge of the third-party batteries, e.g. determine a state of charge of the third-party batteries based on their voltage. Correlation of the state of charge may be performed when it is determined or predicted that the third-party loads are not drawing power from the third-party batteries, e.g. in order to improve the accuracy of the state of charge assessment. The controller may be further configured to determine a charge time for the third-party batteries, e.g. according to their state of charge. The controller may determine the charge time by referring to a data model or look up table of charge times stored on a memory of the controller, or another memory. The controller may be configured to prepare to control the operation of an alternator of the vehicle to charge the third-party batteries when a subsequent engine start is detected. For example, the controller may store the determined charge time in a memory and may control the operation of the alternator until the alternator has been operating for the determined charge time.

The electrical system may further comprise a temperature sensor. The temperature sensor may be configured to record a temperature, e.g. an air temperature at or near the controller, vehicle batteries or third-party batteries. The controller may be configured to determine a temperature from the temperature sensor, e.g. a temperature recorded by the temperature sensor. The first threshold value may be at least partially determined according to the temperature recorded by the temperature sensor. Additionally or alternatively, the third period of time may be at least partially determined according to a temperature recorded by the temperature sensor. This may allow the vehicle batteries to be maintained at a higher state of charge to improve starting of the engine in cold conditions.

The controller may comprise an override input. The override input may allow a user to delay isolation of the terminal from the vehicle batteries following a warning signal provided to the user. The delay may be for a predetermined period of time. The number of overrides permitted may be limited over a particular time period. Such a feature may advantageously permit the user to finish a task, e.g. lowering a cherry picker.

The controller may comprise an input for receiving a signal from other vehicle systems. The signal may instruct the controller to isolate the vehicle batteries from the terminal. For example, a vehicle system, such as a power steering system, may require a large load and may instruct the controller to shed the third-party loads to ensure there is enough for that vehicle system.

As mentioned above, the first threshold value may be a voltage indicative of a charging state for a battery and the second threshold value may represent a low or minimum acceptable voltage value for a battery. Accordingly, it will be appreciated that the first threshold voltage value may be greater than the second threshold voltage value. However, the first and second threshold values may not be fixed and they may vary depending on the particular scenario, the particular battery and/or the battery configuration.

The various voltage and time threshold values mentioned above may be selected to reflect the likely values encountered by real world third-party loads for commercial vehicles.

The controller may be configured to control the relay to isolate the terminal from the vehicle batteries if the current exceeds a threshold current value.

Additionally or alternatively, the controller may be configured to control the relay to isolate the terminal from the vehicle batteries if the current remains above a threshold current value for a sixth predetermined period of time.

The controller may be configured to determine a power consumed by the third-party batteries and/or loads. The controller may be configured to control the operation of the relay at least partially according to the power consumed.

The controller may comprise an input for receiving a signal from the third-party electrical system, e.g. from one or more third-party loads, the signal indicating that the third-party loads are drawing power from the vehicle batteries. The second threshold value may be determined at least partially according to the signal. Additionally or alternatively, the first threshold value and/or another threshold value may be determined at least partially according to the signal. Additionally or alternatively again, the first and/or second threshold values and/or another threshold value may be determined according to the current drawn by the third-party batteries and/or loads.

The controller may be further configured to control the running speed of an engine of the motor vehicle. The engine running speed may be controlled at least partially according to the operation of the relay. Additionally or alternatively, the engine running speed may be controlled at least partially according to the current drawn by the third-party batteries and/or loads.

According to another aspect of the present disclosure, there is also provided a vehicle comprising the electrical system according to a previously mentioned aspect of the disclosure.

According to another aspect of the present disclosure, there is also provided a method of controlling the operation of an electrical system of a motor vehicle. The electrical system comprises: one or more vehicle batteries configured to provide electric power to one or more vehicle systems; a terminal configured to allow third-party loads and/or third-party batteries to be electrically coupled to the vehicle electrical system at the terminal; and a relay configured to selectively couple the terminal to the vehicle batteries. The method comprises determining a current drawn by the third-party batteries and/or loads; and controlling the operation of the relay to couple the terminal to the vehicle batteries and/or isolate the terminal from the vehicle batteries at least partially according to the determined current.

The method may comprise determining a voltage of the third-party batteries and/or loads. The operation of the relay may be controlled at least partially according to the determined voltage.

The method may comprise determining a battery configuration of the vehicle batteries and/or third-party batteries. The operation of the relay may be controlled at least partially according to the determined battery configuration.

The method may further comprise detecting an engine ignition activation and/or an engine start attempt.

The method may comprise determining a voltage of the third-party batteries and/or loads. The method may further comprise providing an output signal if an engine ignition activation is detected when the determined voltage is above a first threshold value.

The operation of the relay may be controlled to isolate the terminal from the vehicle batteries when the engine ignition activation is detected. Additionally or alternatively, the operation of the relay may be controlled to isolate the terminal from the vehicle batteries when an engine start attempt is detected.

The method may comprise: detecting a first engine start attempt; detecting a second engine start attempt; and controlling the operation of the relay to couple the terminal to the vehicle batteries if the second engine start attempt is detected within a first predetermined period from the first engine start attempt.

The method may comprise: determining a voltage of the third-party batteries and/or loads. The operation of the relay may be controlled to couple the terminal to the batteries if the determined voltage is at or above a second threshold value.

The method may comprise: detecting an engine start; controlling the relay to couple the terminal to the batteries following a second period of time, e.g. after the engine start.

The method may comprise: determining a voltage of the third-party batteries and/or loads. The length of the second period may be at least partially determined according to the determined voltage.

The method may comprise controlling the operation of an alternator of the vehicle to provide power to the vehicle electrical system following a successful engine start.

The method may comprise determining a voltage of the third-party batteries and/or loads. The alternator may be controlled to provide power to the vehicle electrical system if the determined voltage is below a second threshold value.

The method may comprise determining a battery configuration of the vehicle batteries and/or third-party batteries. The second threshold value may be determined at least partially according to the battery configuration.

The method may comprise determining a voltage of the third-party batteries and/or loads. The method may further comprise controlling the operation of the relay to isolate the terminal from the vehicle batteries, after the engine has started, if the determined voltage is above a first threshold value.

The method may comprise determining a voltage of the third-party batteries and/or loads. The method may further comprise controlling the relay to couple the terminal to the vehicle batteries if the determined voltage is above a first threshold value.

The method may further comprise detecting an engine off event. The method may further comprise controlling the operation of the relay to isolate the terminal from the vehicle batteries after a third period of time after the engine off event.

The method may comprise determining a battery configuration of the vehicle batteries and/or third-party batteries. The third period of time may be determined at least partially according to the battery configuration.

The method may comprise controlling the operation of the relay to isolate the terminal from the batteries when a voltage of the batteries drops below a second threshold value.

The method may comprise controlling the operation of the relay to isolate the terminal from the vehicle batteries when a voltage of the vehicle batteries remains below a second threshold value for a fifth period of time, after the engine off event.

The method may comprise providing a low voltage warning signal when a voltage of the vehicle batteries remains below a second threshold value for a fourth period of time, after the engine off event.

The method may comprise determining a battery configuration of the vehicle batteries and/or third-party batteries. The second threshold value may be determined at least partially according to the battery configuration.

The method may comprise: correlating the state of charge of the third-party batteries; determining a charge time for the third-party batteries; and preparing to control the operation of an alternator of the vehicle to charge the batteries when a subsequent engine start is detected. For example, the method may comprise storing the determined charge time in a memory; and controlling the operation of the alternator until the alternator has been operating for the determined charge time.

The electrical system may further comprise a temperature sensor. The method may comprise determining a temperature from the temperature sensor. The first threshold value may be at least partially determined according to a temperature from the temperature sensor. Additionally or alternatively, the third period of time may be at least partially determined according to the temperature from the temperature sensor. For example, the controller may be configured to increase the third period of time when the temperatures are higher and decrease the third period of time when the temperatures are lower. In other words, the third-party system may be connected to the vehicle electrical system for a longer time after engine off in the summer as opposed to the winter. This feature could be particularly beneficial for vehicles destined for countries with cold climates, e.g. the Nordic market, where more energy may be required for a cold engine start.

According to another aspect of the present disclosure, there is provided a method of testing an electrical system for a motor vehicle, the electrical system comprising: one or more vehicle batteries configured to provide electrical power to one or more vehicle systems; a terminal configured to allow one or more third-party loads and/or one or more third-party batteries to be electrically coupled to the vehicle electrical system at the terminal; a relay configured to selectively couple the terminal to the vehicle batteries; and a controller configured to control the operation of the relay, the controller being further configured to control the operation of an alternator of the motor vehicle, wherein the method comprises: configuring the controller to control the operation of the alternator; and determining, by referring to a further controller of the vehicle, that the operation of the alternator is being controlled.

The electrical system may comprise an alternator controller controlled by the controller. The alternator controller may be connected to a network bus, e.g. a controller area network bus, of the vehicle and may be configured to send signals via the network bus. The alternator controller may be provided within a smart recharge system of the vehicle. The electrical system may comprise the further controller.

The further controller may be coupled to a network bus of the motor vehicle and the controller may not be coupled to the network bus. Determining that the operation of the alternator is being controlled may be performed by determining that a relevant message has been received by the further controller via the network bus.

The systems and methods disclosed herein advantageously control operation of the relay to protect third-party batteries from excessive crank cycles, such as a heavy inrush current that can damage batteries, such as leisure type batteries. Furthermore, the systems and methods disclosed herein advantageously control the operation of the relay to maximize remaining energy in the vehicle battery systems by intelligent isolation of third-party loads, when not required. The various controls described herein improve fuel efficiency, reduce emissions due to less overall charge time required and may also reduce battery warranty issues. Furthermore, intelligent control of the relay by state of charge voltage assessment remaining in vehicle battery may help to ensure there is enough energy remaining to crank and start the engine. Moreover, the intelligent control of the relay provides the vehicle user with the Homologation requirements for the vehicle's normal drive cycle, but when required also provides a capable workhorse for an electrical power take off for the commercial Vehicle sector.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

For a better understanding of the present invention, and to show more clearly how it may be carried into effect, reference will now be made, by way of example, to the accompanying drawings, in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
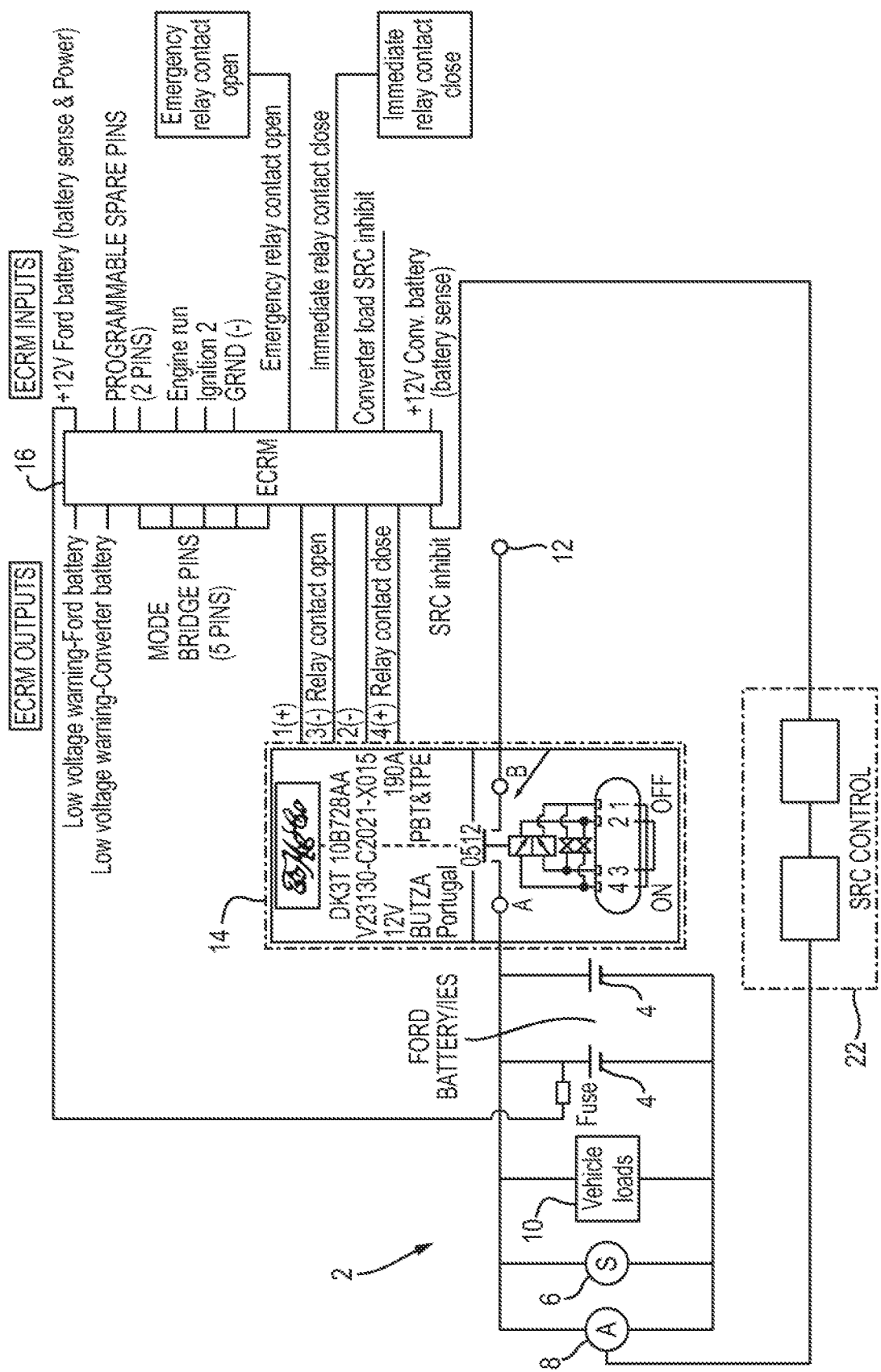
FIG. 1 is a schematic diagram of an electrical system for a vehicle configured to facilitate electrical conversion, according to arrangements of the present disclosure.

With reference to FIG. 1, an electrical system 2 for a vehicle, such as a motor vehicle, may comprise one or more batteries 4, a starter motor 6, an alternator 8 and one or more vehicle loads 10. The vehicle loads 10 may comprise any systems of the vehicle that require electrical power, such as an engine ignition system, head lights, air conditioning and/or a stereo system.

In operation of the vehicle, the batteries 4 may be configured to provide power to the starter motor 6, to turn over and start an engine of the vehicle. While the engine is running, the alternator 8 may be driven by the engine to generate electricity to charge the battery 4, as well as to provide electrical power to the vehicle loads 10.

In order to improve the efficiency of the vehicle and/or the batteries 4, a smart recharging system may be used. The smart recharging system may selectively deactivate the alternator 8, e.g. disconnect the alternator from the electrical system 2, when the battery is at or near an optimal State of Charge (SOC). The smart recharging system may selectively reactivate the alternator 8 as required to charge the battery 4 and maintain the battery at or near the optimal SOC. For example, the alternator may be activated as necessary to maintain the battery 4 between 65% and 80% charge, or any other desirable range. Deactivating the alternator 8 may prevent power being drawn from the engine by the alternator 8, which may increase the efficiency of the engine. The longevity of the battery 4 may also be improved by remaining at or near the optimal state of charge, without being continuously charged while the engine is running.

As described above, when the electrical system 2 is provided within a light commercial vehicle, it may be desirable to facilitate electrical conversion of the vehicle, by third-party vehicle convertors or the vehicle manufacture, to incorporate non-standard, third-party electrical equipment. In order to facilitate the connection of third-party electrical systems to the electrical system 2 of the vehicle, the electrical system 2 may comprise a terminal 12.

The terminal 12 may be configured to allow the third-party electrical system 30, described with reference to FIG. 2 below, to be electrically coupled to the vehicle electrical system 2 and to draw power from the batteries 4 and/or the alternator 8. The terminal 12 may be a power take-off terminal for the third-party electrical system 30. The terminal 12 may be provided at a convenient location on the vehicle to provide good access for the vehicle converters to electrically couple the third-party electrical system 30 to the vehicle electrical system 2.

A relay 14 may be provided within the vehicle electrical system between the batteries 4 and the terminal 12. The relay 14 may be configured to selectively couple the terminal 12 to the batteries 4 and/or the alternator 8, to allow the third-party electrical system 30 to draw power from the batteries 4 and/or alternator 8.

Figure 2:
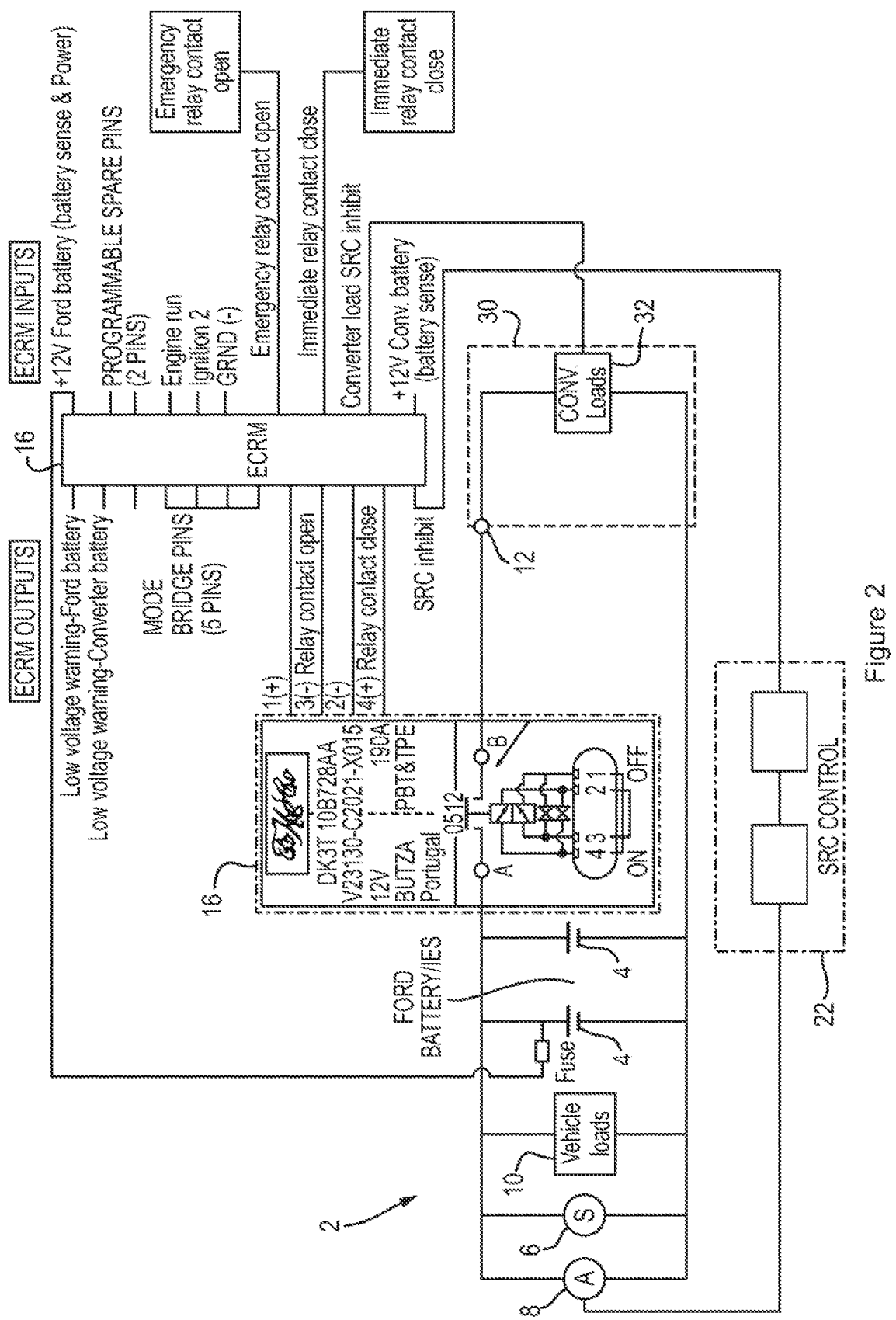
FIG. 2 is a schematic diagram of an electrical system for a vehicle which has undergone electrical conversion, according to an arrangement of the present disclosure.

With reference to FIG. 2, the vehicle electrical system 2 may be coupled to a third-party electrical system 30 at the terminal 12. The third-party electrical system 30 may comprise one or more third-party loads 32. The third-party loads may comprise, for example, additional lighting, electrical invertors, hydraulic pumps or other electrical devices and equipment.

As shown in FIG. 2, the third-party electrical system 30 may not comprise a third-party battery, the loads 32 may therefore depend on electrical power from the batteries 4 and/or the alternator 8 in order to function. Alternatively, as shown in FIG. 3, the third-party electrical system 30 may comprise one or more third-party batteries 34, which provide power to the third-party loads 32 when the third-party electrical system 30 is not coupled to the vehicle electrical system 2, e.g. when the relay 14 is open.

If the third-party electrical system 30 comprises a third-party battery 34, when the relay 14 is closed, the third-party electrical system may be powered by the third-party battery 34, the vehicle batteries 4 and/or the alternator 8. If the third-party battery 34 has a low state of charge, the third-party battery may be charged by the alternator 8 and/or the vehicle batteries 4. Alternatively, if the third-party battery 34 is operating, or capable of operating, at a higher voltage than the vehicle batteries 4, the vehicle batteries 4 may be charged by the third-party batteries 34 when the relay 14 is closed.

Figure 3:
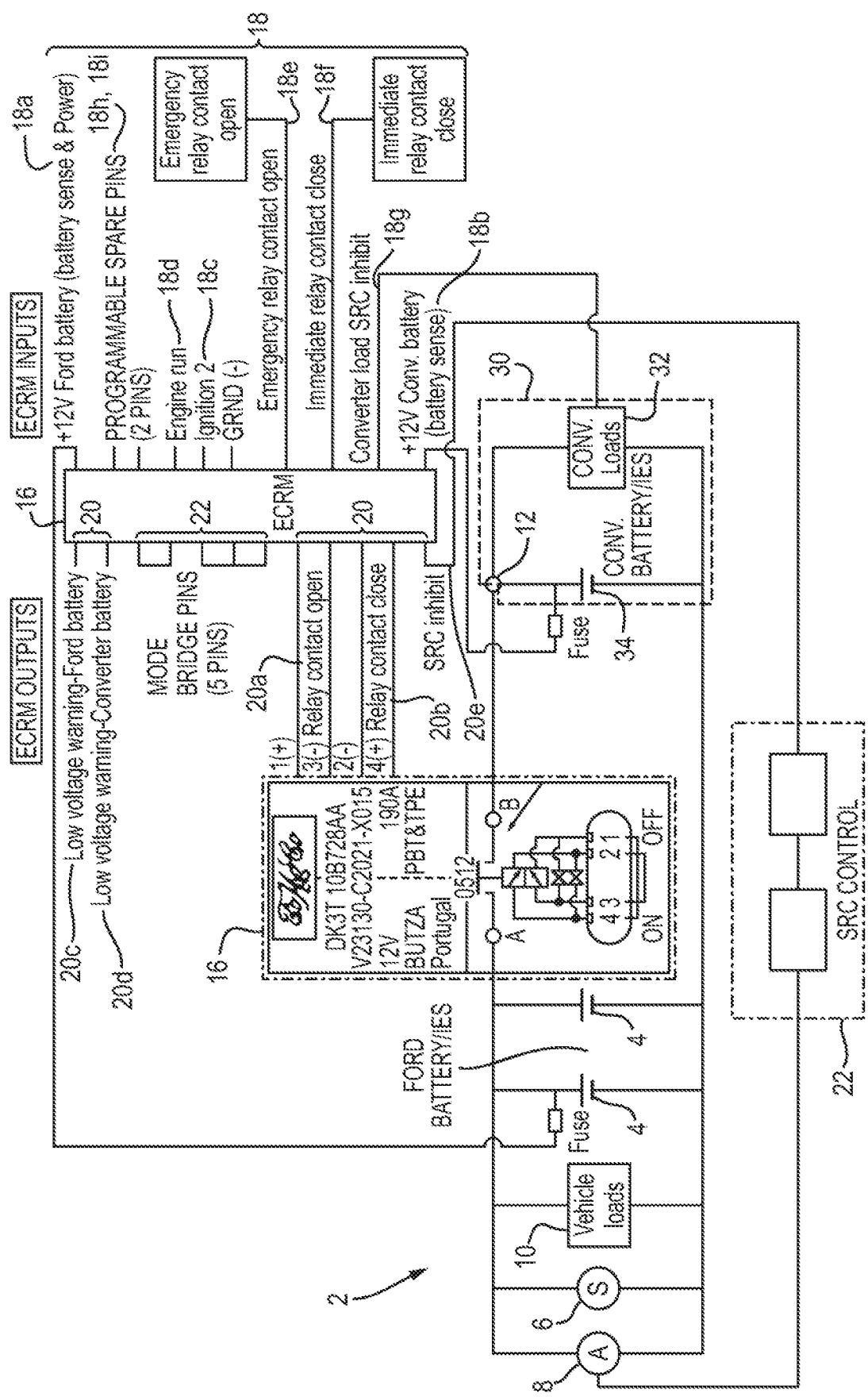
FIG. 3 is a schematic diagram of an electrical system for a vehicle which has undergone electrical conversion, according to another arrangement of the present disclosure.

As shown in FIGS. 1 to 3, the electrical system 2 may further comprise a controller 16. The controller 16 may be configured to control the operation on the relay 14 to selectively couple and decouple the terminal 12 to and from the batteries 4 and/or the alternator 8. The controller 16 may comprise a relay control circuit (not shown) configured to provide a suitable output signal for controlling the operation of the relay 14. The relay control circuit may comprise one or more transistors such as Field Effect Transistors (FETs) or Metal Oxide Semiconductor Transistors (MOSFETs)

The controller 16 may comprise a plurality of inputs 18, which the controller may consider to determine how to control the relay 14. The inputs 18 may be configured to receive signals indicating the state and/or condition of the vehicle and/or the third-party electrical system 30. For example, a first input 18a may receive a signal that is indicative of the state of charge of the vehicle batteries 4, e.g. a voltage across the vehicle batteries; a second input 18b may receive a signal that is indicative of the state of charge of the third-party batteries 34, e.g. a voltage across the third-party batteries; a third input 18c may receive a signal indicating whether the vehicle ignition is active, e.g. whether electrical power is being provided to ignition system of the vehicle to allow the engine to run; and a fourth input 18d may receive a signal indicating whether the engine of the vehicle is running.

Under normal operation, the controller 16 may consider the signals indicating the state and/or condition of the vehicle electrical system 2 and/or the third-party electrical system 30 described above, and may determine whether it is most beneficial for the relay 14 to be open or closed. The determination may be made by performing one or more methods described in more detail below. However, in certain circumstances, it may be desirable to override any determination made by the controller 16 in order to command the relay to be open or closed, e.g. in order to isolate any third-party systems, or provide power to them, e.g. in an emergency. A fifth input 18e may be configured to allow the relay 14 to be opened and a sixth input 18f may be configured to allow the relay to be closed.

The override input may allow a user to delay isolation of the terminal from the vehicle batteries following a warning signal provided to the user. The delay may be for a predetermined period of time. The number of overrides permitted may be limited over a particular time period. Such a feature may advantageously permit the user to finish a task, e.g. lowering a cherry picker.

Additionally, one or more of the controller inputs 18 may be configured to allow other systems of the vehicle to be controlled, for example a seventh input 18g may be provided to allow the operation of the alternator to be controlled. Such inputs may be used by the controller 16 to generate outputs to be sent from the controller 16 to another controller, such as a Powertrain Control Module (PCM) 22 provided on the vehicle, to implement the request. Providing such inputs on the controller 16 may allow the vehicle converters to access other functions of the vehicle, without direct access to the PCM 22.

If desirable, one or more further inputs 18h, 18i may be provided and configured to receive other vehicle or third-party system information signals, sensor inputs or control inputs as desirable. The inputs 18a-18i described above may be provided in any order on the controller 16. For example, the controller may comprise a further input that may receive a command from another module of the vehicle. The other module may instruct the controller to isolate the third-party loads by opening the relay, e.g. if energy availability is reduced and required for critical systems only.

The controller 16 may comprise a plurality of outputs 20. One or more of the outputs may be configured to provide signals to the relay 14, to open and/or close the relay. For example, a first output 20a may be configured to provide a signal to open the relay 14 and a second output 20b may be configured to provide a signal to close the relay 14. The first and second outputs 20a, 20b may be provided by the relay control circuit described above.

Additionally, one or more of the outputs 20 may be configured to provide other outputs signals. For example, a third output 20c may be configured to provide a low battery warning signal when the state of charge of the vehicle batteries are below a threshold value; and a fourth output 20d may be configured to provide a low battery warning signal when the state of charge of the third-party batteries are below a threshold value.

One or more of the outputs 20 may be configured to send control signals to other controllers of the vehicle, such as the PCM 22. For example, a fifth output 20e may be configured to send a signal to the PCM, to control the operation of the alternator 8. The output from the fifth output 20e may respond to or relay an input signal provided to the seventh input 18g. The controller 16 may further comprise one or more additional outputs configured to provide any other desired output signals.

The controller 16 may comprise a plurality of mode indicator selectors 22, the mode indicator selectors may be electrically coupled to each other in certain configurations to select an operating mode of the controller, e.g. the controller 16 may determine an operating mode by determining the connections made between the mode indicator selectors 22. The operating mode of the controller may be set depending on the characteristics of the vehicle and/or third-party electrical systems. For example, as shown in FIGS. 1 to 3, the mode indicator selectors 22 may be electrically connected in different configurations, e.g. according to the presence of a third-party battery within the third-party electrical system 30. The mode indicator selectors 22 may therefore provide the controller 16 with an indication of a battery configuration of the vehicle batteries and/or third-party batteries. The battery configuration may relate to the number and/or type of batteries provided on the vehicle and/or within the third-party electrical system. For example, whether the batteries are flooded, Absorbed Glass Mat (AGM), or gel type lead acid batteries. The controller 16 may refer to the battery configuration when controlling the operation of the relay 14, as described below.

Figure 4:
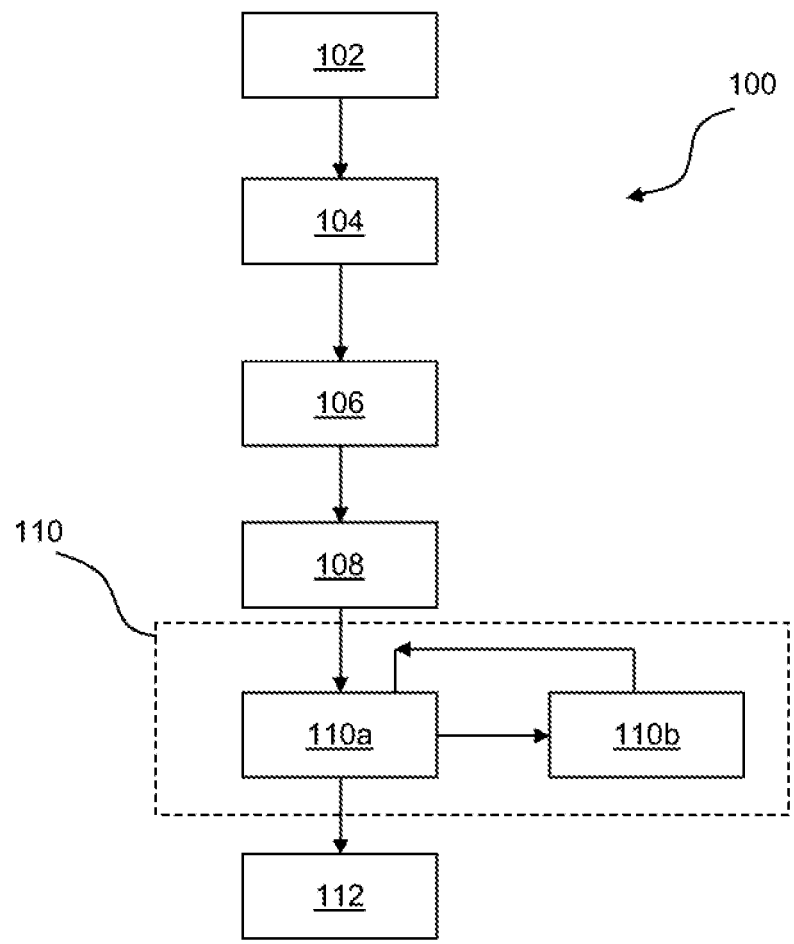
FIG. 4 shows a method of operating a vehicle according to an arrangement of the present disclosure.
Figure 5:
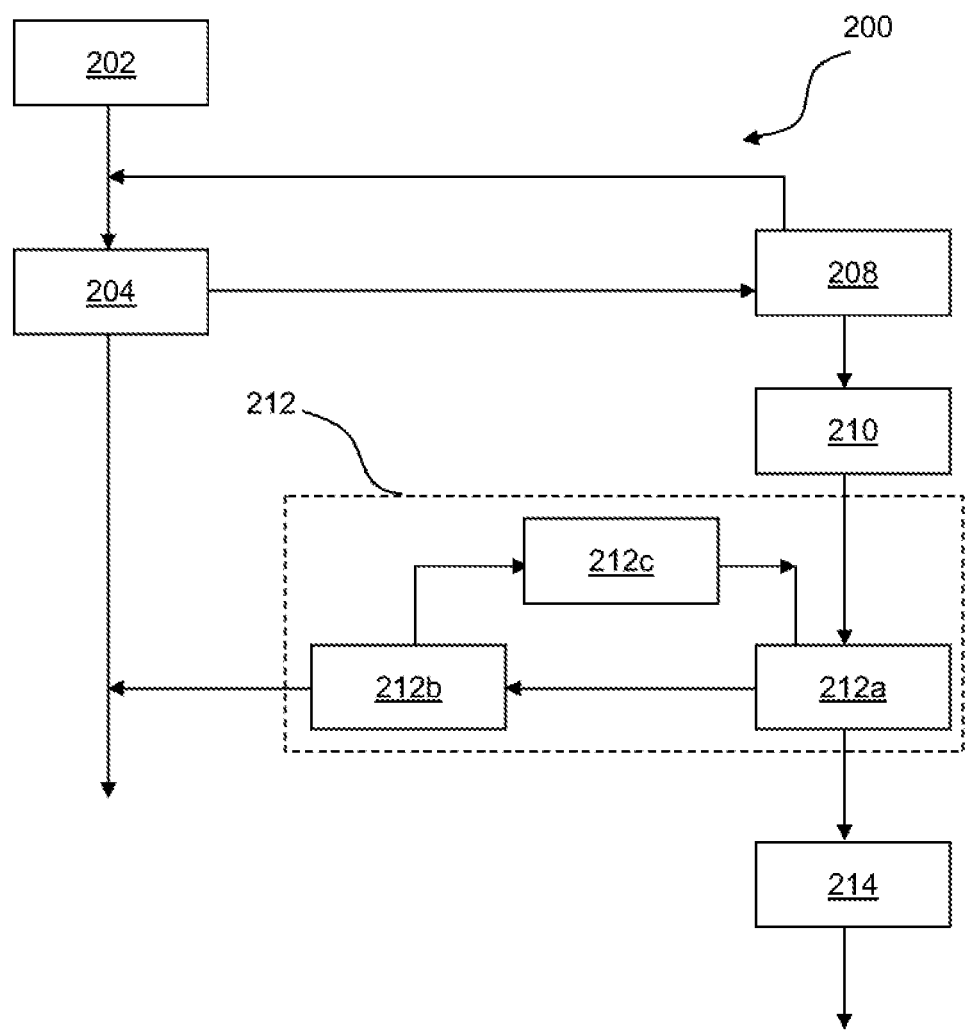
FIG. 5 shows a method of operating a vehicle according to another arrangement of the present disclosure.
Figure 6:
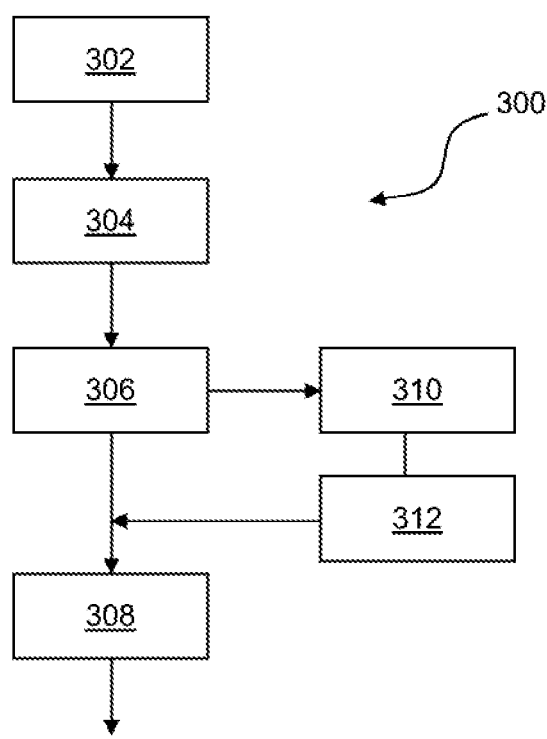
FIG. 6 shows a method of operating a vehicle according to another arrangement of the present disclosure.
Figure 7:
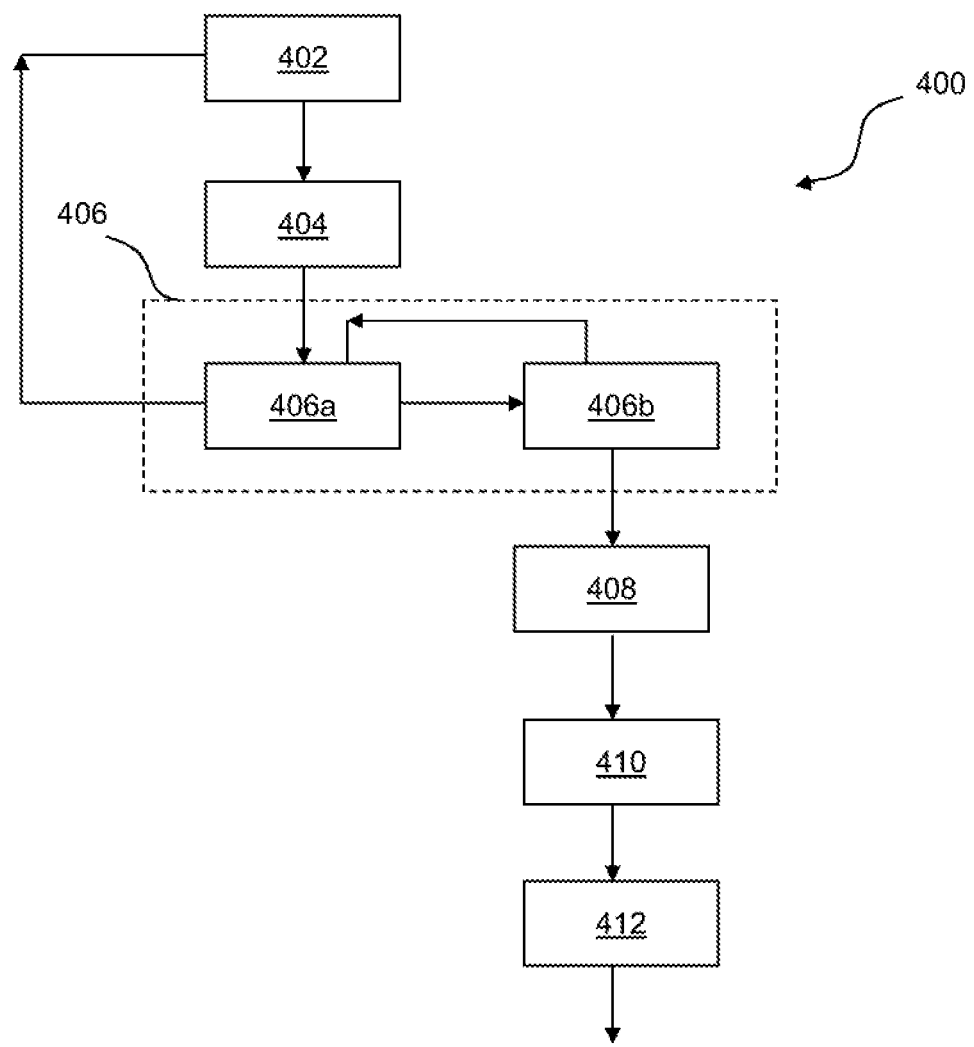
FIG. 7 shows a method of operating a vehicle according to another arrangement of the present disclosure.

With reference to FIGS. 4 to 6, the controller 16 may be configured to control the operation of the relay 14 according to one or more methods, such as the methods 100, 200, 300 and 400 described below. Each of the methods described below may be performed regardless of the operating mode of the controller 16.

With reference to FIG. 4, a first method 100 may begin at a first step 102 when an engine start event is detected. The engine start event may be detected, for example, by an input at the fourth input 18*d* of the controller. The controller 16 may continue monitoring the fourth input 18*d* until a second step 104 in which it is determined that the engine has stopped running.

At the point when the controller 16 reaches the second step 104, the relay may be closed, and third-party loads 32 may be drawing power from the vehicle electrical system 3, e.g. from the batteries 4. Operation of the relay 14 between engine start and engine stop events, e.g. between the first and second steps 102, 104, may be controlled by another method of the controller 16, such as the third method 300 described in detail below.

After the engine stop event is detected in the second step 104, the controller 16 proceeds to the third step 106, in which a permitted operating time is determined. The permitted operating time may represent a time period during which third-party loads 32 may be permitted to continue drawing power from the vehicle electrical system 2, following the engine stop event. The permitted operating time may be determined at least partially according to the battery configuration of the vehicle electrical system 2 and/or the third-party electrical system 30. For example, if the vehicle electrical system 2 comprises two batteries 4, then the permitted operating time may be longer than if the vehicle electrical system comprises a single battery 4.

In the fourth step 108, a minimum permitted voltage of the vehicle electrical system may be determined. The minimum permitted voltage may be the minimum voltage that it is desirable for the battery to be reduced to, e.g. such that the battery will not be deep cycled or reduced to a voltage at which it may not be possible to start an engine of the vehicle. The minimum permitted voltage may be determined at least partially according to the battery configuration of the vehicle electrical system 2 and/or the third-party electrical system. For example, if the vehicle electrical system 2 comprises a flooded lead acid type battery, the minimum permitted voltage may be higher than if the vehicle electrical system comprises an AGM type battery.

The minimum permitted voltage and/or the permitted operating time may be determined by referring to a database or look-up table stored on the controller 16 or on another memory system (not shown). The minimum permitted voltage and/or the permitted operating time may be determined by considering the operating mode selected via the mode indicator selectors 22, e.g. the controller may refer the operating mode to the data model or look-up table to determine the minimum permitted voltage and/or the permitted operating time.

Once the minimum permitted voltage and the permitted operating time have been determined, the controller 16 may enter a control loop 110, in which the controller 16 monitors the time elapsed since the engine off event, and the voltage of the vehicle electrical system 2 and/or third-party electrical system 30. If the elapsed time reaches, e.g. is equal to or greater than, the permitted operating time or the voltage of the vehicle electrical system 2 and/or third-party electrical system 30 is less than, e.g. drops below, the minimum permitted voltage, in the first or second control step 110*a*, 110*b* respectively, the controller 16 may break from the control loop 110. The controller 16 may then proceed to a fifth step 112, in which the controller 16 controls the operation of the relay 14 to disconnect, e.g. isolate, the terminal 12 from the batteries, e.g. the controller may open the relay.

The vehicle electrical system 2 and/or the controller 16 may comprise a temperature sensor (not shown). The temperature sensor may be configured to provide a reading of temperature at or near the controller 16 and/or the vehicle batteries 4. Additionally or alternatively, the third-party electrical system 32 may comprise one or more further temperature sensors (not shown), which may be configured to provide a reading of temperature, at or near the third-party batteries 34, to the controller 16. The permitted operating time and/or the minimum permitted voltage may be at least partially determined according to temperature readings recorded by the temperature sensors and/or further temperature sensors. The signals from the temperature sensors and/or further temperature sensors may be input to the controller 16, e.g. at the further inputs 18*h*, 18*i*.

In some cases, the third-party electrical loads 32 may have high inrush currents, e.g. the current drawn during initial use of the third-party electrical loads may be high. In this case, the voltage of the vehicle batteries 4 and/or the third-party batteries 34 may drop below the minimum permitted voltage whilst the inrush current is being drawn by the third-party load 32. In these circumstances, it may be undesirable for the controller 16 to open the relay 14 due to the low voltage. Therefore, when the controller 16 is performing the first method 100, the controller 16 may not exit the control loop 110 in the second control step 110*b* immediately when the voltage drops below the minimum permitted value. The controller 16 may only exit the control loop in the second control step if the voltage remains below the minimum permitted value for a low voltage cut-off period of time, such as 60 seconds.

Figure 8:
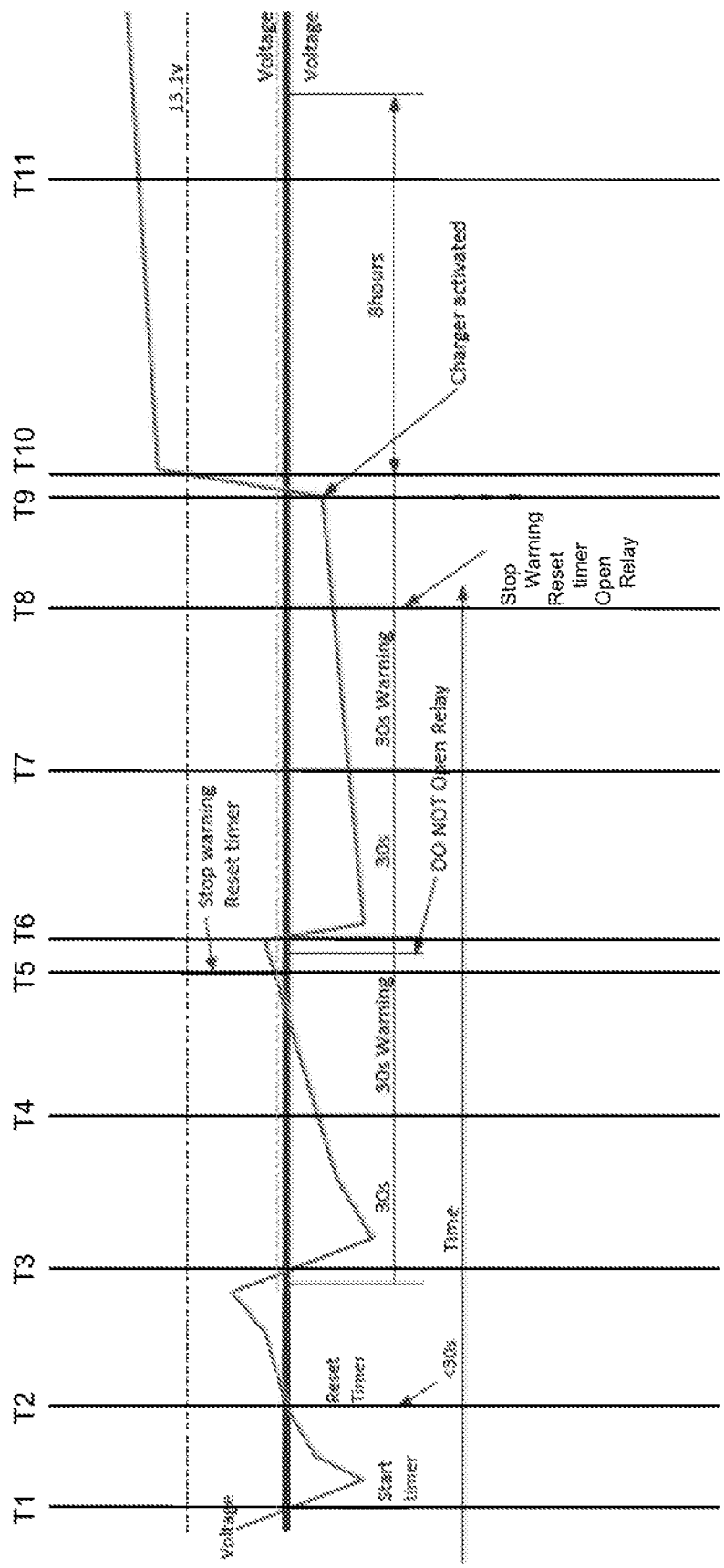
FIG. 8 is a graph showing an example of a voltage against time plot, for the voltage of a third-party electrical system during operation of one or more third-party loads, according to arrangements of the disclosure.

With reference to FIG. 8, while the controller 16 is operating within the control loop 110, the voltage of the vehicle batteries 4 and/or the third-party electrical system 32 may drop sharply at a time T1, to a value below the minimum permitted value. The sharp drop at time T1 may be due to a third-party load, which draws a high inrush current, being switched on. At time T2, the voltage of the vehicle batteries 4 and/or the third-party electrical system 32 may have recovered back to the minimum permitted value. The difference between T2 and T1 may be less that the low-voltage cut-off period and hence the controller 16 may not open the relay.

At a time T3, a second third-party load may be activated, which may draw a high inrush current, and may cause the voltage of the vehicle batteries 4 and/or the third-party electrical system 32 to drop below the minimum permitted value. At time T5, the voltage may have recovered back to the minimum permitted value. Time T5 may be less than the low-voltage cut-off period after time T3, and hence the controller 16 may not open the relay 14. However, the difference between time T4, at which the voltage was still below the minimum permitted value, and time T3 may be greater than a low voltage warning period. When the voltage is below the minimum permitted value for the low voltage warning period, the controller 16 may send a warning signal, e.g. to the driver via a light or buzzer, to indicate that the voltage has dropped below the minimum permitted voltage.

At time T5, the voltage may have recovered to a low voltage warning threshold level, and the controller may cease sending the warning signal. The low voltage warning threshold level may be greater than the minimum permitted voltage.

At a time T6, a third-party load may be activated, which may draw a high inrush current causing the voltage of the vehicle batteries 4 and/or the third-party electrical system 32 to drop below the minimum permitted value. At time T8, which is at the low voltage cut-off period after T6, the voltage may not have recovered to the minimum permitted value, and hence the controller may control the relay to decouple the terminal 12 from the vehicle electrical system 2, e.g. the controller may break from the control loop 110. The controller 16 may have begun sending a warning signal at time T7, e.g. after the low voltage warning period had elapsed since time T6. When the controller opens the relay at time T8, the controller may also stop sending the warning signal.

When the relay 14 is opened, the third-party electrical system 30 may no longer be able to draw power from the vehicle batteries 4. This may prevent the vehicle battery 4 being drained by the third-party electrical system and may ensure sufficient power is available to start the engine of the vehicle. If the third-party electrical system 30 does not comprise a third-party battery 34, use of the third-party systems may not be continued until the relay is closed. Restarting the engine of the vehicle may cause the relay to be closed, for example due to the controller 16 performing the third method 300 described below. If the third-party electrical system 30 does comprise the third-party battery 34, use of the third-party systems 30 may be continued by operating under the power of the third-party batteries 34. Third-party batteries 34 may therefore be installed if it is desirable to enable use of the third-party systems 30, e.g. loads 34, which would otherwise undesirably drain the vehicle battery 4, e.g. such that the voltage would be brought below the minimum permitted value, and/or to extend the length of time that the third-party systems 30 may be used following an engine stop event.

Once the first method 100 has reached the fifth step 112, the vehicle may be in a state in which the engine is not running and the relay is open, isolating the terminal 12 from the batteries 4. In many cases, it may be desirable for the vehicle to remain in this state until the driver starts the engine. However, if a battery charger is coupled to the third-party electrical system 30 or the vehicle batteries 4, it may be desirable for the relay to be closed, such that the other of the third-party batteries 34 and the vehicle batteries 4 can be charged.

The controller 16 may perform a second method 200, to allow the vehicle batteries 4 and third-party batteries 34 to be charged using a single battery charging device.

The second method 200 may begin in a first step 202 when the vehicle engine is not running, and the relay 14 is open. In a second step 204, the controller 16 may determine whether the engine has been started. If the engine has been started, the controller 16 may cease performing the second method 200 and may proceed to performing the third method 300, described below, to determine whether the relay should be closed.

If, in the second step 204, it is determined that the engine has not been started, the controller 16 may proceed to a fourth step 208, in which the voltage of the third-party electrical systems 30 and/or the vehicle batteries 4 is determined and compared to a first, e.g. upper, threshold value. (The first threshold value may be a value of voltage at which it may be determined that an external charger is being used to charge a battery of the third-party electrical system or vehicle.) If the determined voltage is less than the first threshold value, it may be determined that the third-party battery 34 and/or vehicle battery 4 is not currently charging. If the batteries are not currently charging, the controller 16 may return to the second step to determine whether the engine has been started. The controller 16 may continue to perform the second and fourth steps until the engine is started, or the determined voltage rises above the first threshold value.

If the voltage determined in the fourth step 208 is above the first threshold value, it may be determined that the vehicle batteries 4 and/or the third-party batteries 34 are being charged. The controller 16 may therefore proceed to a fifth step 210 in which the relay 14 is closed and the terminal 12 is coupled to the vehicle electrical system 2. Closing the relay may ensure that both the vehicle batteries 4 and third-party batteries 34 are charged. Once the relay 14 is closed, the controller 16 may enter a battery charging control loop 212, which may control the operation of the relay while the batteries are charging.

While in the charging loop 212, the controller may check whether the desired charge time has elapsed, in step 212a; whether the engine ignition has been activated, in step 212b; and/or whether the voltage has dropped below the first threshold level, in step 212c. If any of these conditions is satisfied, it may be desirable to stop charging the batteries, and the controller 16 may proceed to a sixth step 214, in which the relay 14 is opened.

Once the relay has been opened in the sixth step 214, the vehicle may be in the same state as at the start of the second method 200, and the controller 16 may return to the first step 202. Engine running may then be detected in the second step 204, which may cause the controller to begin performing the third method 300, described below.

If the method has already performed the fifth step 210 to close the relay, and has already operated in the charging control loop 212, it may be undesirable for the controller 16 to return to the fifth step 210 in the second method 200, e.g. because the batteries 4, 34 may already be charged. Hence, in the fourth step 208, the controller 16 may only proceed to the fifth step 210, is if is determined that the relay has not been closed since the last engine stop event. The controller 16 may only return to the fifth step 210 following a subsequent engine stop event, e.g. if the engine is started and stopped.

With reference to FIG. 8, at a time T9, a charger may be connected to the third-party battery 34, which causes the voltage of the thirst party electrical system 30 to rise. At a time T10, the voltage of the third-party electrical system 30 may reach the first threshold value and hence the controller 16 may control the operation of the relay 14 to couple the terminal to the vehicle electrical system 30 to charge the vehicle batteries 4, e.g. according to the method 200. At a time T11, the ignition of the vehicle may be enabled, and the controller 16 may open the relay 14.

In most cases, the relay 14 will already be open when the engine is starting. However, in some cases it may be desirable for the relay 14 to be closed when the engine is starting. Control of the relay 14 while the engine is starting is described in detail below with reference to the fourth method 400.

If the relay 14 is open when the engine is being started, it may be desirable to close the relay 14, e.g. immediately close the relay 14, once the engine has been started, to enable the third-party electrical system 30 to draw power from the vehicle battery 4 of the vehicle and/or from the alternator 8. However, in some circumstances, it may not be desirable to close the relay 14 immediately. For example, if the voltage of the third-party system 30 is low, it may be undesirable to allow the third-party system 30 to draw power from the vehicle electrical system 2 immediately following engine start. Similarly, if the vehicle battery voltage is low, if may not be appropriate for power to be supplied immediately from the vehicle battery 4 to the third-party systems 30.

In order to determine when the relay 14 should be closed following engine start, the controller 16 may perform a third method 300. The third method 300 may begin at a first step 302, in which an engine start event is detected. In a second step 304, the controller 16 may determine a second, e.g. lower, threshold voltage for the third-party electrical system 30, below which it is undesirable to couple the third-party electrical system 30 to the vehicle electrical system 2. (The second threshold value may be a value of voltage which indicates a low or minimum state of charge of a vehicle or third-party system battery.)

The second threshold voltage may be determined at least partially according to the battery configuration of the vehicle electrical system 2 and/or the third-party electrical system 30. The second threshold voltage may be determined by referring to a database or look-up table stored on the controller 16. The second threshold value may be determined by referring to the operating mode determined by the mode indicator selectors 22.

In a third step 306, the controller 16 may compare a voltage of the third-party electrical system 30 and/or a voltage of the vehicle electrical system 2 to the second threshold value. If both the determined voltages are equal to or greater than the second threshold value, the relay 14 may be closed, in a fourth step 308. Alternatively, if the determined voltage of the third-party electrical system is below the second threshold value, the controller may proceed to a fifth step 310, in which the controller 16 sends a control signal to the PCM 22 to ensure that the alternator 8 is operating to provide power to the vehicle electrical system 2. The signal may be sent from the fifth output 20*e* of the controller, as mentioned above. By contrast, if the determined voltage of the vehicle electrical system 2 is below the second threshold, it may be undesirable to connect the relay 14 until the vehicle batteries 4 have reached an acceptable state of charge.

In a sixth step 314, the controller 16 may delay for a predetermined alternator start-up period to ensure that the alternator 8 is able to begin providing power to the vehicle electrical system 2 and/or the third-party electrical system 30 before the relay 14 is closed. The controller 16 may then proceed to the fourth step 308 in which the relay 14 is closed to allow the third-party electrical system 30 to draw power from the vehicle electrical system, e.g. from the batteries 4 and the alternator 8. By delaying for the predetermined alternator start-up period, the alternator 8 may be allowed to begin operating effectively and the voltage of the vehicle electrical system 2 may not be detrimentally affected by coupling the third-party electrical system 30 to the vehicle electrical system 2, e.g. by coupling the terminal 12 to the vehicle batteries 4. Additionally, delaying closing the relay 14 may allow a suitable voltage to be made available, e.g. by the alternator 8, to power the third-party systems 30.

It may be undesirable for an external battery charger to be coupled to the vehicle battery system while the engine is running. Hence, if it is determined that the voltage of the third-party electrical system 30 is above the first threshold value when an engine start event is detected, the relay 14 may not be closed. Additionally, the relay 14 may be opened, e.g. immediately opened, if the voltage of the third-party electrical system 30 exceeds the first threshold value (mentioned above with reference to the second method 200) while the engine is running. The relay 14 may only be opened in these circumstances when the alternator 8 of the vehicle is not operating, e.g. as the alternator 8 may itself raise the voltage of the third-party electrical system 30 above the first threshold value.

If an engine start event is detected whilst the voltage of the third-party electrical system 30 is above the first threshold value, it may be determined that a battery charger may be connected to the third-party electrical system 30. The controller 16 may therefore provide a warning signal, which may alert the driver to the possibility that a charger is coupled to the third-party electrical systems 30, e.g. to prevent the driver from driving away accidentally before disconnecting the charger.

In some cases, it may be desirable to install third-party loads 32 within the third-party electrical system 30, which require a higher voltage than the batteries 4 and/or third-party batteries 34 are able to provide in order to operate effectively. In these cases, it may be desirable for the alternator 8 to be operating, and the relay 14 to be closed while the third-party load 32 is operating. As mentioned above, the vehicle may comprise a smart recharging system, which may deactivate the alternator 8 when the battery 4 is within a desired range of state of charge. Hence, in order to ensure the alternator 8 is operating, the third-party electrical system 30 may include a user input, which allows an input to be provided to the seventh control input 18*g* of the controller 16. As described above, the controller 16 may apply the input signal at the seventh input 18*g* to provide an output to the PCM 22 of the vehicle from the fifth output 20*e*. When receiving the signal from the fifth output, the PCM 22 may inhibit the smart recharging system, which may cause the alternator 8 to be activated.

If the relay 14 is currently open when the controller 16 receives a signal at the seventh input 18*g*, the controller 16 may send the signal to the PCM 22 and may delay for the predetermined alternator start-up time, e.g. approximately 5 seconds, before closing the relay.

If the voltage of the third-party electrical system 30 is too high, it may be undesirable to activate the alternator 8. Hence, if the voltage of the third-party electrical system is above a threshold value, the controller 16 may not provide the signal to the PCM 22.

When the controller 16 stops receiving the signal at the seventh input 18*g*, the controller 16 may stop providing the signal to the PCM 22 to control operation of the alternator 8. The smart recharging system may then resume control of the alternator 8.

If the third-party electrical system 30 is equipped with one or more third-party batteries 34, the smart recharging system of the vehicle may not monitor the SOC of the third-party batteries 34. Hence, it may be desirable for the controller 16 to monitor the voltage of the third-party batteries 34 and infer an estimate of the SOC of the third-party batteries 34, the controller 16 may monitor the SOC of the third-party batteries 34, via an input at the second input 18*b*, as described above.

If the SOC of the third-party batteries 34 drops below a desired range, the controller 16 may send an alternator control signal to the PCM 22, via the fifth output 20*e*, to control the operation of the alternator 8, e.g. to inhibit the smart recharging system and activate the alternator 8. If the relay 14 is open, the controller 16 may delay for the predetermined alternator start-up time after sending the alternator control signal, before closing the relay 14 to allow the third-party battery 34 to be charged by the alternator 8.

After an engine stop event, the controller 16 may correlate the estimated SOC of the third-party battery 34 over a predetermined battery correlation period. Over this period, it may be most likely that power is not being drawn from the third-party battery 34. Hence, correlating the SOC in this way may allow the estimate of the SOC of the third-party battery 34 to be improved.

Once the SOC has been correlated, if the SOC is below the desired range of SOC, the controller 16 may determine the length of charge time required for the third-party battery 34 to be charged back up to within the desired range of SOC, e.g. to a desired state of charge, such as 80% charged. The controller 16 may continue to send the signal to the PCM 22 to control the operation of the alternator 8 until the third-party batteries 34 have been charging for the determined required charge time.

The controller 16 may track the amount of time that the engine has been running with the alternator 8 operating and the relay 14 closed, e.g. the amount of time that the third-party batteries 34 have been charging. The controller 16 may continue to track the charging time over any engine start and engine stop events during the determined required charge time. Once the controller 16 has determined that the third-party batteries 34 have been charging for the determined required charge time, the controller 16 may stop sending the signal to the PCM 22 to control the operation of the alternator 8. The smart charging system may then resume control of the alternator 8.

When a subsequent engine stop event is detected, the controller 16 may correlate the estimated SOC of the third-party battery system 34 to determine whether further charging is required. The process of controlling the alternator 8 to change the third-party battery 34 may be repeated as necessary.

In order to determine the length of charge time required for the third-party battery 34, the controller 16 may refer to a database or look-up table provided in a memory of the controller 16 or another memory (not shown). The charge time may be at least partially determined according to the battery configuration of the vehicle electrical system 2 and/or the third-party electrical system 30.

If the third-party electrical system 30 is not equipped with a third-party battery 34, when the controller 16 determines that the voltage of the vehicle electrical system 2 or the third-party electrical system 30, e.g. when the relay is closed, corresponds to a state of charge that is below the desired range of SOC. The controller 16 may not close the relay 14, e.g. when it otherwise would be closed. Closing of the relay 14 may be prevented in order to allow the vehicle battery 4 to be charged. The smart recharging system may control the operation of the alternator 8 appropriately to allow the batteries 4 of the vehicle to be charged. Hence, when it is determined that the vehicle batteries 4 are below the desired range of SOC, the controller 16 may not send a signal to the PCM 22 to control the alternator 8.

As mentioned above, in most circumstances, it may be desirable for the relay 14 to be open while the engine is starting. This may prevent the operation of the third-party loads 32 being disrupted, e.g. due to a high current being drawn by the starter motor 6. Additionally, any third-party batteries 34 provided in the third-party electrical system 30 may not be exposed to the high current required by the starter motor 6. However, in some circumstances, such as when the SOC of the vehicle battery 4 is low, it may be desirable for the relay 14 to be closed to allow the third-party batteries 34 to provide power to assist with starting the engine. The controller 16 may perform a fourth method 400 to determine whether the relay 14 should be closed when starting the engine.

The fourth method 400 may begin in a first step 402, when the controller 16 determines that the engine ignition has been activated. In a second step 404, the controller 16 may detect a first engine start attempt. If the engine start event is successful, the fourth method 400 may end, and the third method 300, described above, may be performed by the controller 16 to control the operation of the relay 14. If the engine start event is not successful in the second step 404, the controller 16 may proceed to a control loop 406. The control loop 406 may be configured to determine whether there is a second engine start attempt within a predetermined engine start attempt period. The controller 16 may determine, in a first control step 406a, whether the predetermined engine start attempt period has elapsed. When the predetermined engine start attempt period has elapsed, the method may break from the control loop 406 and return to the first step 402. Alternatively, if a second engine start is attempted within the predetermined engine start attempt period, the controller 16 may detect the second engine start attempt in a second control step 406b. If a second engine start attempt is detected within the predetermined engine start attempt period, the controller 16 may immediately close the relay, in a third step 408, to allow the third-party battery 34 to provide power to the starter motor 6, to assist in starting the engine. The controller 16 may delay in a fourth step 410 for a predetermined engine start assist period, to allow time for the engine to be started by the starter motor 6, before opening the relay 14 again in a fifth step 412. After the relay 14 has been reopened, if the engine start attempt was successful, the controller 16 may perform the third method 300 described above, to continue controlling the operation of the relay 14. If the engine has not started, the fourth method 400 may end.

The controller 16 may be configured such that the fourth method 400 may only be performed once following each engine stop event. The controller 16 may consider that the fourth method 400 has been performed if the relay 14 has been closed following a second engine start attempt being detected, e.g. if the method reaches the third step 408. The fourth method 400 may only be performed again following a successful engine start and subsequent engine stop.

Alternatively, the controller 16 may be configured to allow the fourth method 400 to be performed multiple times after an engine stop event. In this case, if the second engine start event is not successful, and the engine ignition is still enabled, the fourth method 400 may return to the first step 402. It will be appreciated that if the engine ignition is deactivated while the fourth method 400 is being performed, e.g. during the predetermined engine start attempt period, the controller 16 may stop performing the fourth method 400.

The vehicle comprising the vehicle electrical system 2 may be provided with an automatic engine start/stop system, which automatically stops the engine of the vehicle in certain conditions, for example when the vehicle is stationary and is in a neutral gear. When the vehicle is converted, e.g. provided with the third-party electrical system 30, including third-party batteries 34 and/or third-party loads 32, it may be desirable to deactivate the engine start/stop system. For example, if the vehicle has been converted into an emergency services vehicle, it may be undesirable for the engine to automatically stop at an inconvenient time. However, in some cases the engine start/stop system may remain enabled. In this case, the methods described above may still be performed. However, the controller 16 may determine whether the engine has stopped running due to the engine start/stop system, e.g. if the engine has stopped while the engine ignition is still activated, and the relay 14 may be immediately opened to prevent third-party loads 32 drawing power from the vehicle battery 4. This may ensure the engine is able to start again when controlled by the engine start/stop system.

In the arrangements described above, the relay 14 is an electromechanical relay comprising an electromagnet configured to mechanically operate a switch within the relay 14. However, it is equally envisaged, that the relay 14 may comprise a semiconductor device configured to selectively permit a flow of electrical current through the device. For example, the relay 14 may comprise a FET or a MOSFET. When the relay 14 comprises a semiconductor device, references to opening the relay or isolating the terminal from the batteries may relate to operating the semiconductor device to restrict the flow of electrical current through the device. Similarly, references to closing the relay or connecting the terminal to the batteries may relate to operating the semiconductor relay to allow the flow of electrical current through the device.

As described above, the controller 16 may comprise one or more further inputs 18h, 18i. In one or more arrangements of the present disclosure, one of the further inputs 18h, 18i, or another input of the controller 16 may be configured to receive a signal indicating a current draw of one or more of the third-party batteries 34 and/or loads 32. The electrical system 2 or the third-party electrical system 30 may comprise a current sensor configured to determine the current being drawn by the third-party batteries and/or loads. For example, the current sensor may comprise a resistor, e.g. a shunt resistor, arranged in series with the third partly batteries and/or loads. The current sensor may be configured to provide a signal, e.g. a voltage across the shunt resistor, indicating the current drawn by the third-party electrical system to the controller 16.

The controller 16 may be configured to control the operation of the relay 14 at least partially according to the current drawn by the third-party batteries 34 and/or loads 32. For example, if the current exceeds a first threshold current value, the controller 16 may control the operation of the relay 14 to isolate the terminal from the vehicle batteries 4. Additionally or alternatively, the controller 16 may be configured to control the operation of the relay 14 to isolate the terminal from the vehicle batteries 4 if the current drawn by the third-party systems 30 exceeds a second threshold current value for a sixth predetermined period of time. The first and/or second threshold current values may be set at least partially according to the battery configuration of the vehicle.

Additionally or alternatively, the controller 16 may use the value of current being drawn in order to determine one or more of the threshold voltages mentioned above, such as the minimum permitted value and/or the low voltage warning threshold level. For example, if a high current is being drawn by the third-party batteries 34 and/or loads 32, it may be expected that a voltage of the vehicle batteries 4, third-party batteries 34 and/or third-party loads 32 may be reduced and that such a reduction may not be reflective of the state of charge of the vehicle and/or third-party batteries 34. Hence, it may be desirable to reduce the voltage at which the controller 16 controls the operation of the relay 14 to isolate the terminal 12 from the vehicle batteries 4. Control of the threshold voltages in this way may be particularly beneficial when the vehicle engine is not operating and the alternator 8 may not be activated to increase the voltage provided by the vehicle electrical system 2.

When the electrical system 2 and third-party electrical system 30 are not configured to provide a signal to the controller 16 indicating the value of current being drawn by the third-party batteries 34 and/or loads 32, it may remain desirable for the threshold voltages to be appropriately adjusted when it is known that the third-party batteries 34 and/or loads 32 may be drawing sufficient current to reduce the voltage of the vehicle batteries 4. The third-party electrical system 30 may be configured to provide an operating input to the controller 16 to indicate when a current, e.g. a high current, is being drawn. For example, the third-party electrical system 30 may be configured to provide the operating input when a particular third-party load 32, which is expected to draw a high current, is operating. When the operating input is received by the controller 16, the controller 16 may reduce the threshold voltages, e.g. the minimum permitted value and/or the low voltage warning threshold level, accordingly. In arrangements of the disclosure, the controller 16 may reduce one or more threshold voltages by approximately 0.5 volts, 0.3 volts or less.

When the vehicle engine is operating, if the third-party electrical 30 system requires a high power to be provided by the vehicle electrical system 2, the third-party electrical system 30 may provide a signal to the seventh input 18g of the controller 16, in order to control, e.g. activate, the alternator 8 of the vehicle. As mentioned above, adjusting the threshold voltages in response to a high current being drawn by the third-party electrical system 30 may be particularly beneficial when the vehicle engine is not operating. Hence, the operating input may also be provided to the seventh input 18g of the controller 16. When the controller 16 receives the operating input, the controller 16 may adjust the threshold voltage levels accordingly. In some arrangements, the operating signal may be the same signal sent by the third-party electrical system 30 to control the operation of the alternator 8 and may be sent in the same circumstances, e.g. upon activation of a particular third-party load 32. Alternatively, the operating input may be generated separately and/or may be provided to another input of the controller 16.

When the electrical power, e.g. current and/or voltage, being consumed by the third-party electrical system 30 is high (e.g. above a threshold value), it may be desirable for the alternator 8 of the vehicle to be activated in order to increase the voltage of the vehicle electrical system 2 and the power available to the third-party electrical system 30. In some circumstances, for example when a high current is being drawn by the third-party electrical system 30 while the vehicle is stationary, it may be desirable to further increase the power available from the vehicle electrical system 2. Such an increase in power may be achieved by increasing a running speed, e.g. an idle speed, of the engine, in order to increase an operating speed of the alternator 8. The engine idle speed may be controlled by the PCM 22, which may receive an idle speed input indicating a desired engine idle speed and may control the operation of the engine accordingly.

In some arrangements of the disclosure, the controller 16 may comprise an engine speed controller (not shown). The engine speed controller may be configured to provide an idle speed input to the PCM 22 in order to control the engine idle speed as desired. In some arrangements, the engine idle speed may be controlled by the controller 16 depending on an operating condition of the relay 14. For example, when the relay 14 is open, the idle speed may be set to a first idle speed value and when the relay 14 is closed, the idle speed may be set to a second idle speed value, which may be greater than the first idle speed value. The first and second idle speed values may be pre-set idle speed stored by the PCM 22. Alternatively, the first and second idle speed values may be determined by the controller 16 and sent to the PCM 22. Additionally or alternatively, the engine idle speed may be varied according to the current drawn by the third-party electrical system 30. As described above, the current drawn by the third-party electrical system 30 may be determined by a current sensor, which may indicate the current to the controller 16 via the further inputs 18h, 18i.

In some arrangements, the relay control circuit of the controller 16 may be configured to permit more than one relay to be driven via the outputs 20a, 20b of the controller 16. When more than one relay is provided, the relays may comprise any combination of electromechanical and/or semiconductor devices. Additionally or alternatively, one or more relays, e.g. semiconductor relays, may be provided on or within, e.g. internal to, the controller 16. The controller 16 may be configured to provide electrical power directly to one or more third-party loads 32 or batteries 34. The internal relays may be controlled together with the relay 14. Alternatively, the controller 16 may be configured to control the internal relays separately to the relay 14. For example, if a current being drawn by one or more third-party batteries 34 and/or loads 32 coupled to the internal relays exceeds the first threshold current value, the controller 16 may open the internal relay, but may not adjust the operation of the relay 14.

When more than one relay is provided (either internally, externally or in any combination), the relays may be configured to provide power to the third-party batteries 34 and/or loads 32 at different voltages. For example, a first relay, such as the relay 14, may be configured to provide power at 12 volts and a second relay, such as the internal relay, may be configured to provide power at 5 volts. In some arrangements, one of the relays or the internal relays may be configured to provide power at 5 volts via a Universal Serial Bus (USB) port.

In some arrangements of the disclosure, the third-party electrical system 30 may comprise one or more third-party relays (not shown). It may be desirable for the third-party relays to be operated in the same way as the relay 14. For example, it may be desirable for a third-party battery 32 to be disconnected from a particular third-party load 32 when the third-party electrical system 30 is not connected to the vehicle batteries 4 or alternator 8. When the controller 16 is configured to allow more than one relay to be driven from the first and second outputs 20a, 20b, the first and second outputs 20a, 20b may be exposed to the third-party vehicle convertor to allow them to couple third-party relays to the first and second outputs 20a, 20b, such that the third-party relays are operated by the controller 16 together with the relay 14. The third-party relays may be provided within a fuse and/or relay box of the third-party electrical system 30.

Following production of a vehicle comprising a controller 16, it may be desirable to test the vehicle to ensure that the controller 16 is operating correctly. Electronic controllers of the vehicle, such as the controller 16, are typically coupled to a network bus of the vehicle, such as a Controller Area Network (CAN) bus. The operation of a particular electronic controller 16 may therefore be tested by coupling a test apparatus to the bus, or another electronic controller, and monitoring messages being passed over the bus or being received by the other electronic controller. However, in order to reduce the complexity of the controller 16, the controller 16 may not comprise a decoder configured to decode signals being sent via the network bus and hence, the controller 16 may not be coupled to the network bus.

As described above, the controller 16 may be configured to provide an output via the fifth output 20e to a smart recharge system of the vehicle, which may in turn control the alternator 8 of the vehicle. On receiving the output from the controller 16, the smart recharge system, e.g. a controller of the smart recharge system, may be configured to transmit signals via the network bus, e.g. in order to control the alternator 8.

Figure 9:
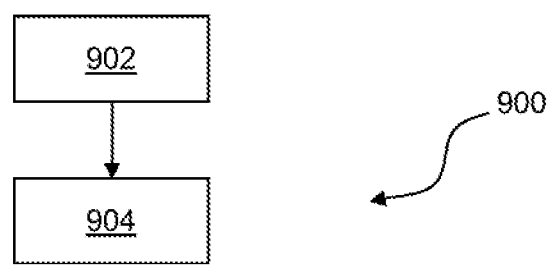
FIG. 9 shows a method of testing an electrical system of a vehicle according to arrangements of the present disclosure.

With reference to FIG. 9, the operation of the controller 16 may be tested by performing a method 900 according to arrangements of the present disclosure. The method 900 may comprise a first step 902, in which the controller 16 is configured to control the operation of the alternator 8. For example, the controller 16 may be configured to operate in a test mode, in which the controller 16 provides an output signal, e.g. via the fifth output 20e, to deactivate and reactive the smart recharge system. The controller 16 may be configured to provide the control signal to the smart recharge system in a pattern that may be easily identified as originating from the controller 16. For example, the controller 16 may be configured to provide an alternating signal that switches between deactivating and activating the smart recharge system, e.g. every 500 ms or any other desirable time period.

As described above, the output sent by the controller 16 may not be sent via the network bus of the vehicle. However, on receiving the output from the controller 16, the smart recharge system, e.g. the controller of the smart recharge system, may transmit a signal via the network bus, which may be received by one or more further controllers of the vehicle that are coupled to the network bus. The method 900 may comprise a second step 904, in which it is determined whether the operation of the alternator 8 is being controlled by the controller 16. For example, the test apparatus may be coupled to the network bus or a further controller of the vehicle. The test apparatus may thereby determine whether the output signal has been sent by the controller 16. For example, by referring to information stored on the further controller.

It will be appreciated by those skilled in the art that although the invention has been described by way of example, with reference to one or more exemplary examples, it is not limited to the disclosed examples and that alternative examples could be constructed without departing from the scope of the invention as defined by the appended claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle electrical system comprising:
   a battery to provide power to one or more vehicle systems;
   a terminal to allow a third-party load and third-party battery to be coupled to the one or more vehicle systems at the terminal;

a relay to selectively couple the third-party load and the third-party battery to the one or more vehicle systems; and a controller to:
control operation of the relay according to a determined current drawn by the third-party load and third-party battery, and
in response to a detected engine ignition activation, provide an output signal and isolate the terminal, via the relay, from the battery if a determined voltage is above a first threshold value being a value of voltage at which it is determined that an external charger is being used to charge the third-party battery.

2. The vehicle electrical system according to claim 1, wherein the controller, in response to a determined voltage of the third-party battery and load, controls the operation of the relay at least partially according to the determined voltage.

3. The vehicle electrical system according to claim 1, wherein the controller, in response to a determined battery configuration of the battery and third-party battery, controls the operation of the relay at least partially according to the determined battery configuration.

4. The vehicle electrical system of claim 3, wherein the controller, in response to a determined voltage of the third-party battery and load being above a second threshold value indicative of the determined battery configuration, couples the terminal, via the relay, to the battery.

5. The vehicle electrical system according to claim 3, wherein the controller, in response to a third period of time determined according to the determined battery configuration after an engine-off event, controls the relay to isolate the terminal from the battery.

6. The vehicle electrical system according to claim 5, wherein the controller, in response to a voltage of the battery remaining below a second threshold for a fourth period of time after the engine off event, provides a low voltage warning signal via a warning device.

7. The vehicle electrical system according to claim 6, wherein the controller controls the relay to isolate the terminal from the battery when a voltage of the battery remains below a second threshold value for a fifth period of time after the engine off event.

8. The vehicle electrical system according to claim 1 further comprising a warning device which, upon receipt of the output signal, triggers a warning to a driver that the third-party batteries are charging via the external charger.

9. The vehicle electrical system according to claim 8, wherein the controller receives an override input that delays isolation of the terminal from the battery following the warning.

10. The vehicle electrical system according to claim 1, wherein the controller, in response to the detected engine ignition activation, controls operation of the relay to isolate the terminal from the batteries.

11. The vehicle electrical system according to claim 1, wherein the controller, in response to first and second engine start attempts, controls the relay to couple the terminal to the battery if the second engine start attempt is within a first predetermined period from the first engine start attempt.

12. The vehicle electrical system according to claim 1, wherein the controller, in response to a detected engine start, controls the relay to couple the terminal to the battery following a second period of time, wherein the second period of time is at least partially determined according to the determined voltage.

13. The vehicle electrical system according to claim 1, wherein the controller correlates a state of charge of the third-party battery;
determines a charge time for the third-party battery; and
controls operation of an alternator to charge the third-party battery when a subsequent engine start is detected.

14. The vehicle electrical system according to claim 13, wherein the controller:
stores the charge time in a memory; and
controls operation of the alternator until the alternator has been operating for the charge time.

15. The vehicle electrical system according to claim 1, wherein the controller controls the relay to isolate the terminal from the battery if a current remains above a threshold current value for a sixth predetermined period of time.

16. A vehicle comprising:
a battery to provide power to one or more vehicle systems;
a terminal to allow a third-party load and third-party battery to be coupled to the one or more vehicle systems at the terminal;
a relay to selectively couple the third-party load and the third-party battery to the one or more vehicle systems; and
a controller to:
in response to a determined current drawn by the third-party load and battery, control the operation of the relay according to the determined current,
in response to a detected an engine ignition activation, provide an output signal and isolate the terminal, via the relay, from the battery if a determined voltage is above a first threshold value being a value of voltage at which it is determined that an external charger is being used to charge the third-party battery.

17. The vehicle according to claim 16, wherein the controller, in response to a determined battery configuration of the battery and third-party battery, controls the operation of the relay at least partially according to the determined battery configuration.

18. A method of operating an electrical system for a motor vehicle comprising:
providing power, via one or more vehicle batteries, to one or more vehicle systems;
coupling, via a terminal, third-party loads and third-party batteries to the one or more vehicle systems at the terminal;
selectively coupling, via a relay at the terminal, the third-party load and third-party batteries to the one or more vehicle systems;
determining a current drawn by the third-party loads and third-party batteries;
operating the relay to couple the terminal to the one or more vehicle batteries, and isolate the terminal from the one or more vehicle systems at least partially according to the current; and
in response to a detecting engine ignition activation, providing an output signal and isolating the terminal, via the relay, from the one or more vehicle systems if a determined voltage is above a first threshold value being a value of voltage at which it is determined that an external charger is being used to charge the third-party batteries.

19. The method according to claim 18 further comprising:
detecting first and second engine start attempts; and controlling the relay to couple the terminal to the one or more vehicle batteries if the second engine start attempt is within a first predetermined period from the first engine start attempt.

* * * * *